United States Patent
Ehlers et al.

(10) Patent No.: US 9,511,847 B2
(45) Date of Patent: Dec. 6, 2016

(54) DEPLOYABLE FLOOR PANEL ARRANGEMENT FOR AIRCRAFT CABIN AREA

(71) Applicant: Airbus Operations GmbH, Hamburg (DE)

(72) Inventors: Bernd Ehlers, Hamburg (DE); Mark Herzog, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/699,401

(22) Filed: Apr. 29, 2015

(65) Prior Publication Data

US 2015/0307179 A1 Oct. 29, 2015

(30) Foreign Application Priority Data

Apr. 29, 2014 (EP) ..................... 14166336

(51) Int. Cl.
| | |
|---|---|
| B64C 1/20 | (2006.01) |
| B64C 1/22 | (2006.01) |
| B64D 47/00 | (2006.01) |
| B64D 11/06 | (2006.01) |
| B64D 9/00 | (2006.01) |
| B64D 11/00 | (2006.01) |

(52) U.S. Cl.
CPC . B64C 1/20 (2013.01); B64D 9/00 (2013.01); B64D 11/0023 (2013.01); B64D 11/0601 (2014.12); B64D 11/0639 (2014.12); B64D 11/0696 (2013.01); Y02T 50/46 (2013.01)

(58) Field of Classification Search
CPC .............. B64C 1/18; B64C 1/20; B64D 9/00; B64D 11/00; B64D 11/0023; B64D 11/0601; B64D 11/0639; B64D 11/0696; B64D 11/062; B64D 2011/0046; B60N 2/3002; B60N 2/3029; B60N 2/3031; B60N 2/3063; B60N 2/3065
USPC ............... 244/118.1, 118.2, 118.5, 118.6
See application file for complete search history.

(56) References Cited

U.S. PATENT DOCUMENTS

| 2,396,039 | A * | 3/1946 | Graves ................... B64D 11/00 244/118.1 |
| 2,799,321 | A | 7/1957 | Liljengren et al. |
| 4,005,902 | A * | 2/1977 | Balin ................... B60N 2/3011 108/11 |
| 2006/0186723 | A1 | 8/2006 | Kawabata et al. |

(Continued)

FOREIGN PATENT DOCUMENTS

| DE | 102011017164 | 10/2012 |
| FR | 2960514 | 12/2011 |

OTHER PUBLICATIONS

European Search Report, Oct. 16, 2014.

Primary Examiner — Richard G Davis
(74) Attorney, Agent, or Firm — Greer, Burns & Crain Ltd.

(57) ABSTRACT

A deployable floor panel arrangement for an aircraft cabin area comprising a substantially planar floor panel with at least one foldable seat arrangement mounted thereto. The seat arrangement comprises at least one backrest which is configured to be moveable between a stowed position in which it extends at an angle of approximately 0° to 40° to the plane of the floor panel and a deployed position in which it extends at an angle of approximately 80° to 180° to the plane of the floor panel.

11 Claims, 3 Drawing Sheets

(56) References Cited

U.S. PATENT DOCUMENTS

2008/0284195 A1* 11/2008 Lawall ................ B60N 2/3011
              296/65.01
2012/0261981 A1  10/2012 Paul

* cited by examiner

DEPLOYABLE FLOOR PANEL ARRANGEMENT FOR AIRCRAFT CABIN AREA

CROSS-REFERENCES TO RELATED APPLICATIONS

This application claims the benefit of the European patent application No. 14166336.9 filed on Apr. 29, 2014, the entire disclosures of which are incorporated herein by way of reference.

BACKGROUND OF THE INVENTION

The present invention relates to a deployable floor panel arrangement for an aircraft cabin area.

When operating an aircraft, it may be desirable to flexibly change a cargo-to-passenger ratio of an aircraft cabin area depending on current demands. In other words, it may be desired to flexibly change the configuration of at least a part of an aircraft cabin area to allow for a transport of either passengers or cargo items, thus flexibly adapting the respective transport capacities of the aircraft.

For transporting passengers, an aircraft cabin area needs to be equipped with seat arrangements. However, in case it is desired to use the aircraft cabin area partially or completely for transporting cargo items, these seat arrangements occupy valuable space. Furthermore, the seat arrangements represent obstacles which limit possible dimensions of cargo items to be transported. Therefore, for allowing for a change from passenger to cargo transport, so far the complete seat arrangements have to be removed from a respective aircraft cabin area. This involves either a manual detachment of single seat arrangements from fastening rails and transporting them out of the aircraft or a complete removal of large palettes to which a plurality of seat arrangements are attached. As major disadvantages, these solutions are very time consuming and require seat arrangements to be present and/or storable at airports for reconfiguring the aircraft cabin area. Also, during loading and unloading of the seat arrangements these are exposed to all weather conditions.

DE 10 2011 017 164 A1 and US 2012/0261981 A1 disclose an equipment module for a vehicle which comprises a floor element, at least one first inductive coupling element and at least one electronics unit. The floor element comprises an attachment means for attaching items of equipment and a retaining means for attaching the floor element at a positioning space in the vehicle. The first inductive coupling element is arranged on the floor element and is connected to at least one electronics unit. The electronics unit is adapted for providing an identification signal by way of the first inductive coupling element, which identification signal makes it possible to identify the equipment module.

SUMMARY OF THE INVENTION

Accordingly, the invention is directed at an object of providing a solution which allows for a faster and more flexible change of the cargo-to-passenger ratio of an aircraft cabin area.

This object is achieved by a deployable floor panel arrangement for an aircraft cabin area which comprises a substantially planar floor panel with at least one foldable seat arrangement mounted thereto. The seat arrangement comprises at least one backrest which is configured to be movable between a stowed position in which it extends at an angle of approximately 0° to 40° to the plane of the floor panel and a deployed position in which it extends at an angle of approximately 80° to 180° to the plane of the floor panel.

In preferred embodiments, the angular range regarding the stowed position may amount to approximately 0° to 10° or, alternatively, to approximately 0° to 20°. Likewise, the angular range regarding the deployed position may amount to approximately 90° to 110° or, alternatively, approximately 90° to 130°. In a highly preferred embodiment, the backrest extends at an angle of approximately 0° to the plane of floor panel in the stowed position. The term "approximately" may in this context generally denote a tolerance of plus/minus 5°.

The backrest typically comprises a front surface which is designed to come in direct contact with a passenger and may generally define a plane. Accordingly, the above-mentioned angular ranges refer in particular to the angle at which said plane of the front surface intersects the plane of the floor panel. This angle may typically be measured so as to extend from the floor panel and in the direction of the front surface.

As further obvious from the above-mentioned angular ranges, the backrest may in its deployed position support a passenger in a substantially upright seating position or in seating positions in which the passenger leans backwards. In the stowed position, to the contrary, the backrest and in particular its front surface are positioned much closer to the floor panel such that the seat arrangement cannot accommodate a passenger.

According to the invention, the seat arrangement is designed to be foldable such that its dimensions can considerably be reduced. For doing so, the backrest of the seat arrangement is provided with a large degree of movability so as be movable between the stowed and deployed position. This is advantageous in that the backrest usually represents a large and space-consuming portion of the seat arrangement. Accordingly, its folding into the stowed position clears a considerable amount of additional space above the floor panel which may hold cargo goods instead. In other words, in the stowed position the backrest can be arranged much closer to the floor panel such that the dimensions of the seat arrangement in a perpendicular direction relative to the plane of the floor panel (i.e., the seat arrangement's height) can significantly be reduced.

Therefore, when a reconfiguration from passenger to cargo transport is desired, additional space of an aircraft cabin area can be cleared for transporting cargo goods without a need for removing the complete seat arrangement from the aircraft. Hence, the solution according to the invention allows for a permanent arrangement of the floor panel and seat arrangement in an aircraft cabin area during both of passenger as well as cargo transport.

In a preferred embodiment, the floor panel may be configured to be attachable to a rotational joint unit or may comprise at least one rotational joint unit that comprises a connection portion for attaching further components. In other words, the floor panel may be configured to be connectable to surrounding structures and provided with a rotational degree of freedom relative thereto. In particular, the rotational joint unit maybe provided in the form of a hinge and be adapted to connect the floor panel to a floor area of an aircraft cabin area. In particular, the joint unit may be configured to allow for a connection to further components such as rail or beam structures located in said floor area. A section or interface of the floor panel that is connected or connectable to a rotational joint unit may, in particular, be located close to an edge region of the floor panel. This allows for a space-efficient connection to adjacent rails, beams or the like.

By providing the floor panel with a rotational degree of freedom according to this embodiment, the floor panel arrangement as a whole and in particular with the seat arrangement in a folded configuration (i.e., with the backrest in its stowed position) can be pivoted or tilted to clear additional floor space for accommodating cargo items. This is in particular rendered possible because, as explained above, the invention allows for a significant reduction of the dimensions of the seat arrangement. Accordingly, the risk of interfering with surrounding components when pivoting the floor panel can be reduced and the floor panel can, for example, be moved very close to a sidewall area of an aircraft cabin area.

In a preferred development of this embodiment, only one seat arrangement holding a maximum of three passengers is mounted on the floor panel. This ensures a weight limitation and thus a manual pivotability of the floor panel.

In a preferred embodiment, the seat arrangement may further comprise at least one leg arrangement and at least one seating area, wherein the leg arrangement may be configured to be foldable whereby the distance of the seating area to the floor panel is reduced. The leg arrangement may generally represent the load bearing structure of the seat arrangement that supports the backrest and the seating area relative to the floor panel. The leg arrangement may be provided in form of a carrier pedestal or a leg structure comprising single profiles, beams, tubes or the like. The seating area may typically extend substantially in parallel to the floor panel and support a passenger in a perpendicular direction relative to the floor panel.

According to this embodiment, the leg arrangement is configured to be foldable, thus enabling a change between a deployed configuration in which it supports the remainder of the seat arrangement for accommodating a passenger and a stowed configuration in which the seating area is brought close to the floor panel. In the latter case, the seat arrangement may not be suitable for accommodating a passenger anymore. Instead, by folding the leg arrangement, the dimensions of the seat arrangement can significantly be reduced similar to moving the backrest in its stowed position as explained above.

In a preferred embodiment, the leg arrangement may be configured to be foldable in such a way that during the folding the seating area is moved towards the floor panel in a pivoting motion. In other words, the leg arrangement may be foldable so that the seating area is not merely perpendicularly moved towards the floor panel but is at least in part also moved in parallel thereto. Thus, when projected into the plane of the floor panel, the position of the seating area is shifted during the folding. This allows for configuring the leg arrangement with a kinematic structure which is highly stable when extended into a deployed position and occupies very little space when folded into a stowed position. Furthermore, this allows for a kinematic structure in which the leg arrangement may in a stowed position at least in part extend in parallel to and in between the seating area and the floor panel, thus being very space-efficient.

In a preferred embodiment, the backrest may be configured to be pivotable relative to the seating area and the seating area may be configured to be foldable in such a way that during the folding a pivoting motion of the seating area and the backrest are oriented oppositely to each other. In particular, the backrest may be configured to be pivoted towards the seating area and the seating area may be configured to be moved towards the floor panel in an oppositely oriented pivoting motion during the folding.

In this connection, when viewed from a passenger as seated in the seat arrangement, the backrest may be configured to be pivoted in a forward direction, whereas the seating area may be pivoted backwards. The pivoting motion of the seating area may in particular be achieved by folding the leg arrangement as explained above. By configuring the seat arrangement so that oppositely oriented pivoting motions are produced, the seat arrangement is generally foldable in a highly space-efficient manner. In particular, this helps to ensure a very small footprint of the seat arrangement in its folded configuration which, for example, limits a required area of the floor panel.

In a preferred embodiment, the seat arrangement may comprise a bench seat comprising a plurality of backrests and seating areas, or a continuous backrest and/or a continuous seating area for supporting more than one passenger, wherein the bench seat may be configured to be foldable by moving the backrests or the continuous backrest into the stowed position. The term "continuous" denotes a design of the backrest and/or seating area such that these are free of substantial projections or gaps. If provided with a continuous backrest, the seat arrangement can be brought into a folded configuration in essentially one step by moving said continuous backrest in the stowed position. Furthermore, according to this embodiment only a small number of leg arrangements may be required for supporting the complete seat arrangement. In particular, the bench seat may be designed to accommodate three passengers next to each other by comprising two outer and one middle seating region. In this case, a leg arrangement may be positioned at each of the outer edges of the bench seat when viewed in a transverse direction, i.e., at the edge regions of the outer seating regions which face away from the middle seating region.

According to a preferred embodiment, the seat arrangement may be configured to not extend beyond the area of floor panel when arranged in a folded configuration. In other words, in a folded configuration (i.e., with the backrest and/or leg arrangement being arranged in a stowed position) the footprint of the seat arrangement when projected into the plane of the floor panel remains within the area of the floor panel. This generally helps to save space and weight. Furthermore, such a configuration is particularly advantageous if the floor panel is configured to be pivotable. This is because it helps to limit possible sources of interferences when moving the floor panel.

The invention furthermore relates to an aircraft cabin area which comprises at least one deployable floor panel arrangement according to any of the previously described types.

In a preferred embodiment, the floor panel of the floor panel arrangement may be configured to be pivotable relative to a floor area of the aircraft cabin area. This pivoting movement may be realized by means of at least one rotational joint unit. In particular, the floor panel may be directly connected to the floor area by such a rotational joint unit. The rotational joint unit may be provided in form a hinge and may connect the floor panel to, for example, a rail or beam structure arranged in said floor area.

In addition to folding the seat arrangement as previously described, the pivoting of the floor panel relative to the floor area allows for clearing additional cabin space and in particular floor space that can be used for cargo instead of passenger transport.

In a preferred embodiment, the floor panel may be configured to be moveable between a deployed position in which it extends substantially in parallel to the floor area of the aircraft cabin area and a stowed position in which it extends at an angle of approximately 50° to 130° to the floor area. In a further preferred embodiment, the angular range regarding the stowed position may amount to approximately 70° to 120°. In a further preferred embodiment, this angular range may amount to approximately 80° to 100°. In a highly preferred embodiment, the floor panel extends at an angle of approximately 90° to the floor area of the aircraft cabin area when arranged in its stowed position. The term approximately may generally denote a tolerance of plus/minus 5° in this context.

According to these embodiments, the floor panel may be moved between a deployed position in which it covers a certain amount of the floor area of the aircraft cabin area and a stowed position in which it extends substantially transverse thereto. In other words, the complete floor panel arrangement may be "folded away", so that cargo items may be positioned in the previously occupied regions of the floor area. In this connection, guiderails may be arranged in the floor area below of the floor panel which are specifically designed to guide and hold cargo loads. In particular, guiderails may be provided in the form of well-known roller tracks to support standardized cargo containers.

In a preferred embodiment, the floor panel arrangement may be configured to be lockable to components of the aircraft cabin area when arranged in its deployed position and/or in its stowed position. The locking may be achieved by mechanical means and preferably by means of snap-in connections or similar locking arrangements involving few manual handling operations. By providing locking means, it is ensured that the floor panel arrangement can securely be held in place and does not pose any safety risks.

In a preferred embodiment, the aircraft cabin area may further comprise at least one sidewall area, wherein the floor panel is moveable into a stowed position by pivoting it towards the sidewall area. In particular, the seat arrangement may be located between the sidewall area and the floor panel when the floor panel is in its stowed position. The sidewall area may generally extend along a longitudinal axis of the aircraft cabin area (i.e., a longitudinal axis extending along a forward flight direction of the aircraft) and transverse to or circumferentially around the floor area of the aircraft cabin area. In particular, the sidewall area may be formed by or connected to a basic shell structure of the aircraft body which typically takes a tubular form.

By pivoting the floor panel towards such a sidewall area, the floor panel can be arranged very close to an edge region of the aircraft cabin area in the stowed position. In this position, the floor panel may generally extend along said sidewall area and transverse to the floor area. Overall, this ensures that the floor panel arrangement occupies as little space as possible when stowed.

In addition, by configuring the floor panel arrangement such that the seat arrangement is located between the sidewall area and the floor panel in the stowed position, it can be guaranteed that the seat arrangement does not extend into regions of the cabin area which should be used for cargo transport. Thus, the seat arrangement does not pose an obstacle which may interfere with the loaded cargo goods. Instead, the floor panel is made to face the regions of the aircraft cabin area which are to be used for transporting cargo with its substantially planar underside.

In a preferred embodiment, the aircraft cabin area may comprise at least two floor panel arrangements that are arranged adjacent to each other along a transverse axis of the aircraft cabin area which extends in the floor area and perpendicularly to a longitudinal axis of the aircraft cabin area. In particular, the floor panels may be moveable into the stowed positions by pivoting them towards oppositely arranged sidewall areas.

As previously described, the longitudinal axis of the aircraft cabin area typically coincides with a forward flight direction of the aircraft. The at least two floor panel arrangements may abut against each other in their stowed positions or be positioned very close to each other along the transverse axis, such that no significant gaps are formed between them. Accordingly, by pivoting them towards oppositely arranged sidewall areas, the two floor panel arrangements may carry out a movement relative to the floor area which, when viewed together, may be described as "swinging open".

In a preferred embodiment, the aircraft cabin area may comprise at least one barrier wall which is configured to be moveable along the longitudinal axis of the aircraft cabin area. The barrier wall may be designed as a planar member. The barrier wall may extend substantially transverse to the longitudinal axis and transverse to the floor area of the aircraft cabin area. In particular, the barrier wall may be designed to extend between oppositely arranged sidewall areas such that it substantially covers a complete cross-sectional area of the aircraft cabin area, wherein the cross-sectional area contains or extends in parallel to the transverse axis of the aircraft cabin area. The barrier wall may be supported by the same guiderails which are provided in the floor area of the aircraft cabin area for supporting cargo containers. Moreover, the barrier wall may be configured to be lockable to the aircraft cabin area to avoid unintended movements. According to this embodiment, a physical boundary in form of the barrier wall can be provided between sections of the aircraft cabin area that are configured for passenger transport and sections configured for cargo transport. The barrier wall's position can furthermore be flexibly adjusted to reconfigurations of the aircraft cabin area by moving it along the longitudinal axis.

In a preferred embodiment, the barrier wall may comprise at least one retractable portion that is retractable to such a degree that the barrier wall may pass by at least one floor panel arrangement with the floor panel in its stowed position. The barrier wall may comprise a retractable portion at one or both end-sections viewed along the transverse axis of the aircraft cabin area. These portions may, for example, be pushed into the body of the barrier wall or folded away. In general, the retractable portion may be retractable by at least that amount with which the stowed floor panel arrangement extends into the aircraft cabin area in a transverse direction.

Generally, an aircraft cabin area according to any of the above specified types may be provided with a plurality of floor panel arrangements which are positioned adjacent to each other. In the deployed positions, the floor panels may define a continuous floor surface within the aircraft cabin area. When reconfiguring the aircraft cabin for cargo transport, either single seat arrangements may be brought into a folded configuration and/or the complete floor panels may be brought into a stowed position as previously described, in particular by pivoting them towards adjacent sidewall areas. Accordingly, the floor area that has previously been covered can selectively or as a whole be cleared for loading cargo goods into the aircraft cabin area without removing any of the floor panels or seat arrangements.

BRIEF DESCRIPTION OF THE DRAWINGS

Preferred embodiments of the invention will now be described in greater detail with reference to the appended drawings, wherein.

DETAILED DESCRIPTION OF THE PREFERRED EMBODIMENTS

Figure 1:
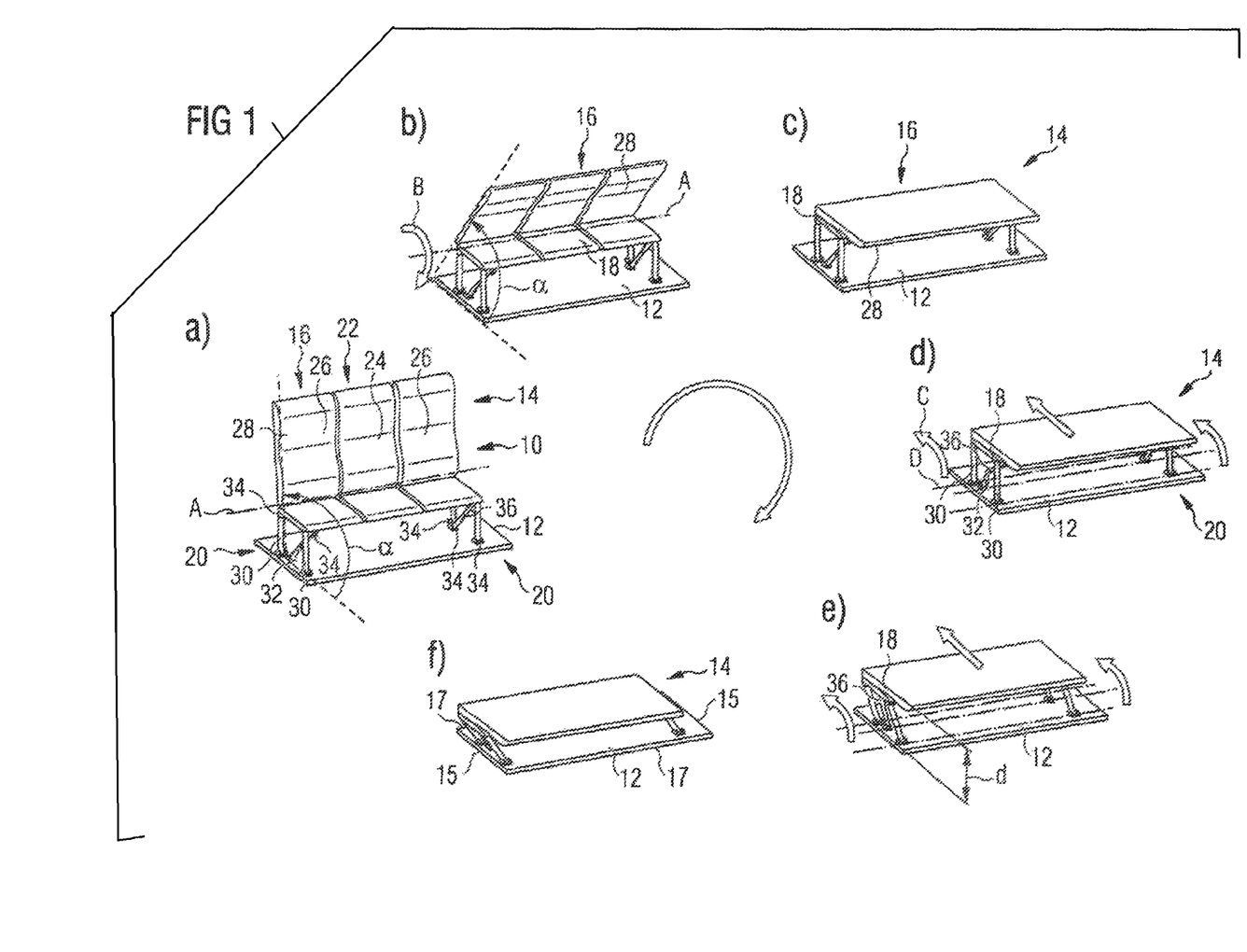
FIG. 1 shows a sequence according to steps a) to f) for folding a seat arrangement of a floor panel arrangement according to an embodiment of the invention.

FIG. 1 shows a perspective view of a deployable floor panel arrangement 10 for an aircraft cabin area 50 according to a first embodiment of the invention. The floor panel arrangement 10 comprises a substantially planar rectangular floor panel 12 to which a seat arrangement 14 is mounted. The seat arrangement 14 comprises a backrest 16, a seating area 18 and two leg arrangements 20. The backrest 16 and seating area 18 are configured as continuous members for simultaneously supporting a plurality of passengers and are provided without any significant gaps or projections. The backrest 16 is pivotably mounted to the seating area 18 around an axis A. The seat arrangement is designed to accommodate up to three passengers by comprising three passenger seats 22 next to each other in the form of a middle seat 24 and two outer seats 26. The leg arrangements 20 are arranged at the outer edges of the outer seats 26 when viewed in a transverse direction of the seat arrangement 14, wherein the transverse direction generally extends along axis A.

The seating area 18 is designed as a substantially planar member that extends in parallel to the plane of the floor panel 12. Both of the backrest 16 and the seating area 18 are supported by the two leg arrangements 20, wherein the leg arrangements 20 are designed equivalent to each other and each comprise two main legs 30 and one support leg 32. Throughout FIG. 1 the relating reference signs may be unevenly distributed between both leg arrangements 20 for illustrative purposes. The main legs 30 and the support leg 32 are connected to the floor panel 12 and the seating area 18 via rotational joint units 34. The support leg 32 furthermore comprises an intermediate joint unit 36 which enables a folding of the support leg 32 during the subsequently described steps.

In step a) the backrest 16 is arranged in a deployed position and the seat arrangement 14 is configured for passenger transport, i.e., arranged in a configuration so as to accommodate passengers. In the deployed position, a front surface 28 of the backrest 16 which is designed to come in direct contact with a passenger extends at an angle α of 90° to the plane of the floor panel 12. In this connection, the front surface 28 of the backrest 16 defines a plane intersecting the plane as defined by floor panel 12 and the angle α is measured so as to extend between these planes and from the floor panel 12 towards the front surface 28. Of course, for accommodating passengers the backrest 16 may extend at different angles α to the plane of the floor panel 12 (e.g., an angle α of 80° to 180°) and/or may be configured in an adjustable manner so that varying angles α may be set in order to improve passenger comfort.

With reference to steps b) to f), a sequence for bringing the seat arrangement 14 into a folded configuration will now be described. As shown in FIG. 1 b), in a first step the backrest 16 is moved towards the seating area 18 in a pivoting motion according to arrow B. By doing so, the angle α between the backrest 16 and the floor panel 12 is reduced. As shown in FIG. 1 c), the backrest 16 is pivoted forward to such a degree that its front surface 28 eventually abuts against the seating area 18 whereby the angle α is reduced to 0°. This marks a stowed position of the backrest 16 in which the seat arrangement 14 is no longer configured to accommodate passengers. Instead, when comparing FIG. 1 a) and FIG. 1 c), by moving the backrest 16 into the stowed position, the dimensions of the seat arrangement 14 have significantly been reduced. This relates in particular to the dimensions when viewed in a direction extending perpendicular to the plane of the floor panel 12.

Starting from FIG. 1 d), a further step of bringing the seat arrangement 14 into a folded configuration by folding the leg arrangements 20 is illustrated. For doing so, the leg arrangements 20 and thus the seating area 18 connected thereto are pivoted in a backward direction according to arrow C. In this process, the support leg 32 is destabilized or folded by means of the intermediate joint unit 36 such that the main legs 30 can be pivoted backwards. It is to be noted that the arrows C and B according to steps b) and d) and the relating pivoting motions of the backrest 16 and the seating area 18 are oriented oppositely to each other. As further obvious from FIG. 1 e), the distance d between the seating area 18 and the floor panel 12 is continuously reduced during the folding of the leg arrangements 20.

FIG. 1 f) shows the seat arrangement 14 in its fully folded configuration. As obvious from this figure, the folded seat arrangement 14 does not extend beyond the area of floor panel 12 in this configuration.

As further indicated in this view, the floor plane 12 comprises oppositely arranged edge regions 15, 17 extending along the above-specified transverse direction (edge regions 17) as well as the forward/backward directions (edge regions 15). In at least one of the edge regions 15, the floor panel 12 is configured with a section or interface for being attached to a rotational joint unit (not illustrated).

It will be understood that depending on current needs, only the steps b) to c) or steps d) to f) may be carried out. In other words, the seat arrangement 14 can be brought into a folded configuration by only selectively folding the backrest 16 or the leg arrangements 20.

Figure 2:
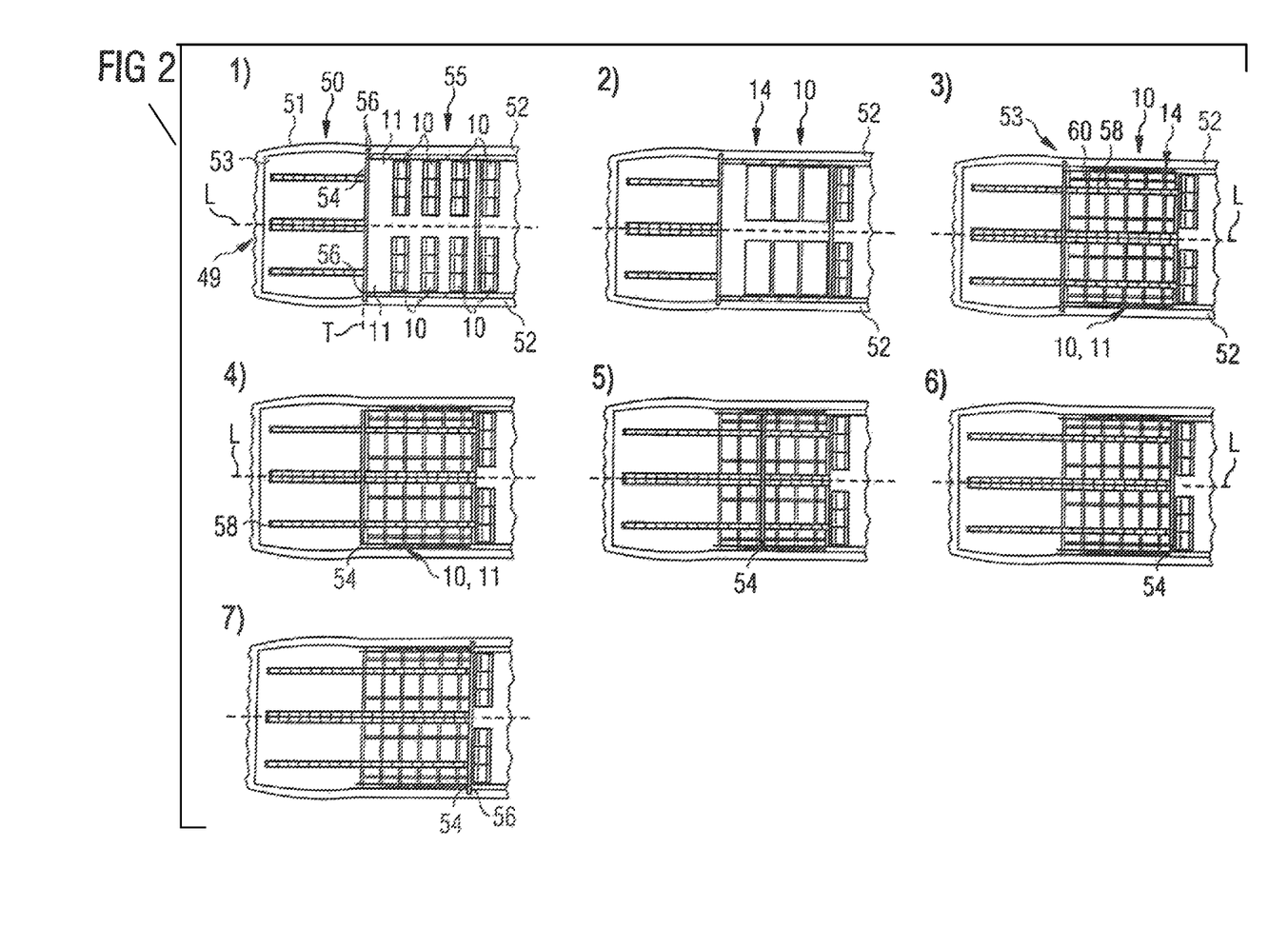
FIG. 2 shows a sequence according to steps 1) to 7) for changing the configuration of an aircraft cabin area according to an embodiment of the invention from passenger to cargo transport.

FIG. 2 shows an aircraft cabin area 50 according to an embodiment of the invention. The aircraft cabin area 50 comprises several floor panel arrangements 10 as discussed with respect to FIG. 1. In FIG. 2, several configurations of the aircraft cabin area 50 are shown according to steps 1) to 7) for changing a part of the aircraft cabin area 50 from passenger to cargo transport.

The aircraft cabin area 50 forms a part of the aircraft cabin as defined by the only partially illustrated aircraft's main body. It extends along a longitudinal axis L and comprises a floor area 53 as well as two oppositely arranged sidewall areas 52. In the shown example, the aircraft cabin area 50 comprises a permanent cargo section 49 which is accessible via a door 51. Furthermore, the aircraft cabin area 50 includes a flexibly reconfigurable passenger/cargo section 55 which comprises a plurality of deployable floor panel arrangements 11 and in particular floor panel arrangements 10 comprising foldable seat arrangements 14 as described above.

Furthermore, a barrier wall 54 is provided which extends substantially transverse to the longitudinal axis L along a transverse axis T and perpendicularly to the floor area 53 and spans from one sidewall area 52 to the other. The barrier wall 54 serves to separate a section of the aircraft cabin area 50 which is configured for passenger transport from a section which is configured for cargo transport. The barrier wall 54 comprises retractable portions 56 at its end sections when viewed in a transverse direction. The barrier wall 54 is configured with hollow sections close to said end sections such that the retractable portions 56 can be pushed into the barrier wall 54.

In step 1) the floor panel arrangements 10 and the seat arrangements 14 are in a deployed position such that passengers may be accommodated therein. The deployed floor panel arrangements 10, 11 generally define a continuous floor surface within the aircraft craft cabin area 53. The barrier wall 54 is located at an end section of the aircraft cabin area 50 such that the deployed seat arrangements 14, respectively the passengers accommodated therein, face the barrier wall 54.

It is to be noted that the gap visible in the floor surface as defined by the deployed floor panel arrangements 10, 11 on the right end of FIG. 11) is provided for illustrative purposes only. It is generally contemplated that the respectively adjacent floor panel arrangements 10, 11 abut against each other when deployed such that no substantial gaps are formed between them.

In the following, a sequence according to steps 2) to 7) of FIG. 2 will be discussed for reconfiguring the aircraft cabin area 50 for cargo transport.

In step 2) the seat arrangements 14 have been brought into a folded configuration according to FIG. 1 f) as previously described. The floor panels 12 are hinged to the floor area 53 by non-illustrated rotational joint units at their outer edges in positions close to the respectively adjacent sidewall areas 52. Accordingly, as shown in step 3), the floor panels 12 can subsequently be pivoted towards said sidewall areas 52. By pivoting the floor panels 12 in this manner, they can be brought into a stowed configuration in which they extend at an angle β (see FIG. 3) of 90° to the floor area 53 of the aircraft cabin area 50. As further obvious from step 3), the folded seat arrangements 14 are located between the floor panels 12 and the sidewall areas 52 in this position.

Furthermore, the stowed floor panels 12 face the inside of the aircraft cabin area 50 that has now been "cleared" for transporting cargo with their planar undersides which previously rested on the floor area 53. In consequence, the adjacent floor panels 12 define continuous and planar sidewalls facing the inside of the aircraft cabin area 50 without providing any obstacles or projections.

As further obvious from step 3), the floor area 53 of the aircraft cabin area 50 which was previously covered by the floor panel arrangements 10 comprises a beam structure 60 which is generally arranged in a net-shaped or crosswise manner. This beam structure 60 supports the deployable floor panel arrangements 10 in their deployed positions (i.e., when arranged as shown in steps 1) and 2)). Moreover, a plurality of four parallel guiderails 58 are provided in the form of well-known roller bars and extends along the longitudinal axis L. These guiderails 58 allow for a support of standardized cargo containers in a well-known manner.

To separate the regions of the aircraft cabin area 50 which are configured for passenger transport from the ones configured for cargo transport, the barrier wall 54 is moved along the longitudinal axis L as described with reference to steps 4) to 7). In step 4) the retractable portions 56 have been retracted into the barrier wall 54 and the barrier wall 54 has already been moved to a slight degree in a forward direction along the longitudinal axis L. For doing so, the barrier wall 54 is supported and guided by the guiderails 58. In the shown position, the barrier wall 54 extends between two oppositely arranged floor panel arrangements 10, 11. However, due to having retracted the retractable portions 56, the barrier wall 54 can be moved past or along these floor panel arrangements 10, 11 without collisions.

According to steps 5) and 6) the barrier wall 54 is moved along the longitudinal axis L past the stowed floor panel arrangements 10, 11 until it has reached the boundary to the remainder of the aircraft cabin area 50 which is configured for passenger transport. According to step 7) the barrier wall 54 is locked in this position and the retractable portions 56 are extended again by being pulled out of the barrier wall 54. Therefore, the barrier wall 54 spans again from one sidewall area 52 to the other so as to provide a secure physical barrier. When comparing the views of FIG. 11) and 7), it is obvious that the cargo capacity of the aircraft cabin area 50 has been considerably increased by clearing large amounts of the floor area 53.

Figure 3:
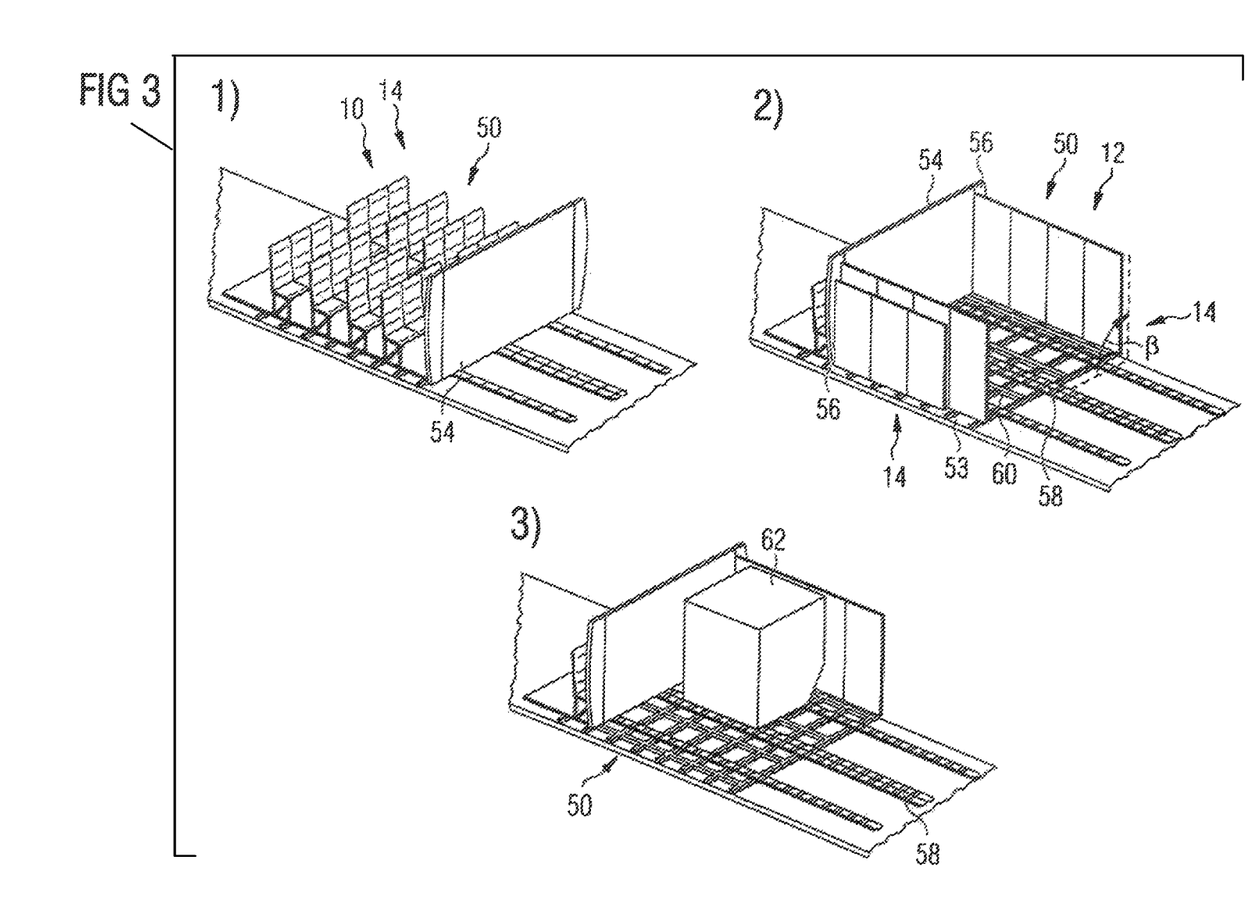
FIG. 3 shows a perspective view of the aircraft cabin area according FIG. 2 and a sequence according to steps 1) to 3) for changing the configuration of said aircraft cabin area from passenger to cargo transport.

FIG. 3 shows a perspective view of an aircraft cabin area 50 according to the embodiment of FIG. 2. Again, a sequence according to steps 1) to 3) is illustrated for changing a configuration of the aircraft cabin area 50 from passenger to cargo transport. In this connection, Step 1) of FIG. 3 represents the initial configuration according to step 1) of FIG. 2.

Step 2) of FIG. 3 represents the situation according to step 7) of FIG. 2) in which the floor panels 12 have been moved into their stowed positions with the seat arrangements 14 in their fully folded configurations. As indicated by the angle β, the floor panels 12 extend perpendicularly to the floor area 53 in this position. In addition, the barrier wall 54 has been moved along the longitudinal axis L and past the stowed floor panel arrangements 10. For doing so the retractable portions 56 can be retracted and then expanded again to provide a proper physical barrier as explained above. Again, one can see the beam arrangement 60 for supporting the floor panel arrangements 10 when deployed as well as the guiderails 58 extending along the longitudinal axis L.

In step 3) of FIG. 3, the accommodation of a common type of cargo container 62 in the reconfigured aircraft cabin area 50 is shown. The cargo container 62 is supported by the guiderails 58 in a well-known manner.

It will be understood that any of the above described sequences with regard to FIGS. 1 to 3 are generally reversible to as to allow for flexible changes between the various configurations of the aircraft cabin area 50 and deployable floor panel arrangement 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cabin area, comprising:
    at least one deployable floor panel arrangement comprising:

a substantially planar floor panel with at least one foldable seat arrangement mounted thereto, wherein the seat arrangement comprises at least one backrest which is configured to be movable between a stowed position in which it extends at an angle of approximately 0° to 40° to the plane of the floor panel and a deployed position in which it extends at an angle of approximately 80° to 180° to the plane of the floor panel, wherein the floor panel is movable between a deployed position in which it extends substantially in parallel to the floor area of the aircraft cabin area and a stowed position in which it extends substantially transverse thereto.

2. The aircraft cabin area according to claim 1, wherein the floor panel is pivotable relative to a floor area of the aircraft cabin area.

3. The aircraft cabin area according to claim 1, wherein the floor panel arrangement is lockable to components of the aircraft cabin area when arranged in its deployed position and/or in its stowed position.

4. The aircraft cabin area according to claim 1, wherein the aircraft cabin area further comprises at least one sidewall area, wherein the floor panel is movable into its stowed position by pivoting it towards the sidewall area, and wherein the seat arrangement is located between the sidewall area and the floor panel when the floor panel is in its stowed position.

5. The aircraft cabin area according to claim 1, wherein the aircraft cabin area comprises at least two floor panel arrangements that are arranged adjacent to each other along a transverse axis of the aircraft cabin area which extends in the floor area and perpendicularly to a longitudinal axis of the aircraft cabin area, and wherein the floor panels are movable into their stowed positions by pivoting them towards oppositely arranged sidewall areas.

6. An aircraft cabin area, comprising:
at least one deployable floor panel arrangement comprising:
a substantially planar floor panel with at least one foldable seat arrangement mounted thereto,
wherein the seat arrangement comprises at least one backrest which is configured to be movable between a stowed position in which it extends at an angle of approximately 0° to 40° to the plane of the floor panel and a deployed position in which it extends at an angle of approximately 80° to 180° to the plane of the floor panel, wherein the floor panel is movable between a deployed position in which it extends substantially in parallel to the floor area of the aircraft cabin area and a stowed position in which it extends at an angle of approximately 50° to 130° to the floor area.

7. The aircraft cabin area according to claim 6, wherein the floor panel is pivotable relative to a floor area of the aircraft cabin area.

8. The aircraft cabin area according to claim 6, wherein the floor panel arrangement is lockable to components of the aircraft cabin area when arranged in its deployed position and/or in its stowed position.

9. The aircraft cabin area according to claim 6, wherein the aircraft cabin area further comprises at least one sidewall area, wherein the floor panel is movable into its stowed position by pivoting it towards the sidewall area, and wherein the seat arrangement is located between the sidewall area and the floor panel when the floor panel is in its stowed position.

10. The aircraft cabin area according to claim 6, wherein the aircraft cabin area comprises at least two floor panel arrangements that are arranged adjacent to each other along a transverse axis of the aircraft cabin area which extends in the floor area and perpendicularly to a longitudinal axis of the aircraft cabin area, and wherein the floor panels are movable into their stowed positions by pivoting them towards oppositely arranged sidewall areas.

11. An aircraft cabin area, comprising:
at least one deployable floor panel arrangement comprising:
a substantially planar floor panel with at least one foldable seat arrangement mounted thereto,
wherein the seat arrangement comprises at least one backrest which is configured to be movable between a stowed position in which it extends at an angle of approximately 0° to 40° to the plane of the floor panel and a deployed position in which it extends at an angle of approximately 80° to 180° to the plane of the floor panel,
wherein the aircraft cabin area further comprises at least one barrier wall which is configured to be movable along the longitudinal axis of the area craft cabin area, and
wherein the barrier wall comprises at least one retractable portion that is retractable to such a degree that the barrier wall may pass by at least one floor panel arrangement with the floor panel in its stowed position.

* * * * *